United States Patent

Hakuta et al.

Patent Number: 5,733,983
Date of Patent: Mar. 31, 1998

[54] HEAT-RESISTANT RUBBER COMPOSITION

[75] Inventors: Takashi Hakuta; Tetsuo Tojo; Masaaki Kawasaki; Mikio Hosoya, all of Ichihara, Japan

[73] Assignee: Mitsui Petrochemical Industries, Ltd., Tokyo, Japan

[21] Appl. No.: 750,821

[22] PCT Filed: Apr. 11, 1996

[86] PCT No.: PCT/JP96/00991

§ 371 Date: Dec. 10, 1996

§ 102(e) Date: Dec. 10, 1996

[87] PCT Pub. No.: WO96/32442

PCT Pub. Date: Oct. 17, 1996

[30] Foreign Application Priority Data

Apr. 11, 1995 [JP] Japan ................. 7-085815
Apr. 11, 1995 [JP] Japan ................. 7-085816

[51] Int. Cl.$^6$ ............................................. C08F 8/00
[52] U.S. Cl. ............... 525/343; 525/331.7; 525/331.8; 525/348; 525/349; 525/350; 525/387
[58] Field of Search ............................. 525/343, 348, 525/349, 350, 387

[56] References Cited

U.S. PATENT DOCUMENTS 3,407,158 10/1968 Gaglielmino et al. .............. 525/387
3,817,952 6/1974 Knabeschuh et al. .............. 525/387
4,268,637 5/1981 Weldy ............................. 525/387
5,278,204 1/1994 Tojo et al. .

OTHER PUBLICATIONS

Abstract of Japanese Laid–Open Patent Publ. No. 55–036251 (Mar. 13, 1980).
Abstract of Japanese Laid–Open Patent Publ. No. 60–023433 (Feb. 6, 1985).

Primary Examiner—Bernard Lipman
Attorney, Agent, or Firm—Sherman and Shalloway

[57] ABSTRACT

A heat-resistant rubber composition of the invention is a vulcanizable composition comprising a specific ethylene-α-olefin-nonconjugated polyene copolymer rubber (A) and an organic peroxide (B). This heat-resistant composition has high crosslinking efficiency given by the organic peroxide and high modulus, and can provide a vulcanized rubber molded product of excellent resistance to environmental deterioration such as thermal aging resistance. The other heat-resistant rubber composition of the invention is a vulcanizable composition comprising 100 parts by weight of a specific ethylene-α-olefin-nonconjugated polyene copolymer rubber (A) composed of ethylene, an α-olefin or 3 to 20 carbon atoms and a nonconjugated polyene which is a vinyl end group-containing norbornene compound, 0.2 to 5 parts by weight of an amine type anti-aging agent (C) and/or a hindered phenol type anti-aging agent (D), 1 to 10 parts by weight of a sulfur type anti-aging agent (E) and an organic peroxide (B). This heat-resistant rubber composition can provide a vulcanized rubber molded product showing not only excellent mechanical properties and electrical properties and but also prominently high thermal aging resistance.

5 Claims, No Drawings

1

HEAT-RESISTANT RUBBER COMPOSITION

TECHNICAL FIELD

The present invention relates to a heat-resistant rubber composition comprising an ethylene-α-olefin-nonconjugated polyene copolymer rubber. More particularly, the invention relates to a vulcanizable heat-resistant rubber composition having high crosslinking efficiency given by an organic peroxide and capable of providing a vulcanized rubber molded product showing not only excellent mechanical and electrical properties but also prominently high thermal aging resistance, specifically a vulcanizable heat-resistant rubber composition having extremely good fluidity (molding processability).

BACKGROUND ART

Crosslinking of ethylene-α-olefin copolymer rubbers is carried out using not sulfur, but organic peroxides, because the copolymers have no double bond in their main chains. The rubbers have been used for automotive parts, industrial packing, electrical wires and electrical wire connecting parts, but these parts are desired to be produced at a low cost. For reducing the production cost, it is included to decrease an amount of an organic peroxide crosslinking agent. In these methods, however, the crosslinking is insufficiently performed, resulting in problems of low modulus and poor resistance to permanent set.

On the other hand, since ethylene-α-olefin-nonconjugated diene copolymer rubbers prepared by copolymerizing ethylene, α-olefins and nonconjugated polyenes have higher crosslinking efficiency given by an organic peroxides than ethylene-α-olefin copolymer rubbers, the amount of the organic peroxide can be decreased. However, with respect to the ethylene-α-olefin-nonconjugated diene copolymer rubber using 1,4-hexadiene, dicyclopentadiene or 5-ethylidene-2-norbornene as the nonconjugated diene, crosslinking is still insufficiently performed, and the thermal aging resistance is low because a large number of double bonds remain after the crosslinking reaction.

By the way, ethylene-propylene copolymer rubbers or ethylene-propylene-diene copolymer rubbers formed by a diene such as ethylidene norbornene, cyclopentadiene or 1,4-hexadiene have excellent mechanical and electrical properties. Moreover, they shows high thermal aging resistance and weathering resistance because they have no double bond in their main chains. Therefore, these rubbers have been widely used for automotive parts, industrial rubber parts, electrical parts and civil engineering and building materials, as described above. In the fields of automotive parts and electrical parts and the like, however, the ethylene-propylene copolymer rubbers and the ethylene-propylene-diene copolymer rubbers have been recently desired to have much higher thermal aging resistance and fluidity (molding processability).

In order to improve a fluidity of the ethylene-propylene copolymer rubbers, a method of adding oils as plasticizers to the copolymer rubbers is generally utilized. In the ethylene-propylene copolymer rubbers prepared utilizing this method, however, there reside problems that the thermal aging resistance of the molded product is lowered and an oil transfer phenomenon (i.e., bleeding) takes place to markedly reduce commercial values.

Further, a method of adding plastics such as polyethylene to the ethylene-propylene copolymer rubbers is also utilized to improve the fluidity. In the ethylene-propylene copolymer rubbers prepared utilizing this method, however, there generally reside problems of low heat resistance and poor elastomeric properties.

Furthermore, an ethylene copolymer rubber composition which is imparted with good processability (fluidity) by blending an ethylene-α-olefin-polyene copolymer rubber having a different molecular weight is proposed in Japanese Patent Publication No. 14497/1984. However, this rubber composition does not show such high thermal aging resistance as desired.

On the other hand, some examples of conventional methods to improve the thermal aging resistance are described below.

(1) An anti-aging agent is added to the ethylene-propylene copolymer rubber or the ethylene-propylene-diene copolymer rubber.

(2) Since a breakage of a polymer main chain, as the heat deterioration reaction, easily takes place, an ethylene-propylene copolymer rubber which is softened after the heat deterioration and an ethylene-propylene-polyene copolymer rubber which is cured after the heat deterioration are blended.

(3) The diene content in the ethylene-propylene-polyene copolymer rubber is decreased.

A large number of combinations of these methods are also proposed.

For example, Japanese Patent Laid-Open Publication No. 23433/1985 proposes a rubber composition for sulfur vulcanization which is prepared by blending 100 parts by weight of an ethylene-α-olefin-diene copolymer rubber having an iodine value of 5 to 12, 1 to 10 parts by weight of a phenol compound and 1 to 4 parts by weight of an imidazole compound.

The compositions proposed in the publication are improved in the thermal aging resistance, but the level thereof is not satisfactory in the uses for automotive parts and electrical parts, so that the thermal aging resistance should be much more improved.

In Japanese Patent Laid-Open Publication No. 108240/1989, a heat-resistant rubber composition comprising an ethylene-α-olefin copolymer rubber, polyorganosiloxane and a silica type filler treated with a silane compound is disclosed as a heat-resistant rubber composition of high thermal aging resistance. The rubber composition disclosed in the publications are obviously improved in the thermal aging resistance, but the level thereof is not satisfactory in the uses for automotive parts and electrical parts, so that the thermal aging resistance should be much more improved. Moreover, these compositions do not show such high fluidity (molding processability) as desired.

Accordingly, development of a vulcanizable heat-resistant rubber composition having high crosslinking efficiency and capable of providing a vulcanized rubber molded product of high thermal aging resistance has been desired.

Further, development of a vulcanizable heat-resistant rubber composition capable of providing a vulcanized rubber molded product of prominently high thermal aging resistance without losing excellent mechanical and electrical properties inherent in the ethylene-propylene copolymer rubber or the ethylene-propylene-diene copolymer rubber has been also desired.

Furthermore, development of a vulcanizable heat-resistant rubber composition showing high fluidity (molding processability) and capable of providing a vulcanized rubber molded product of prominently high thermal aging resistance without losing excellent mechanical and electrical properties inherent in the ethylene-propylene copolymer rubber or the ethylene-propylene-diene copolymer rubber has been also desired.

The present invention is intended to solve such problems associated with the prior art as described above, and it is an object of the invention to provide a heat-resistant rubber composition being vulcanizable and having high crosslinking efficiency and capable of providing a vulcanized rubber molded product of high thermal aging resistance.

It is another object of the invention to provide a heat-resistant rubber composition being vulcanizable and capable of forming a vulcanized rubber molded product showing not only excellent mechanical and electrical properties but also prominently high thermal aging resistance.

It is a further object of the invention to provide a heat-resistant rubber composition being vulcanizable and having extremely good fluidity and capable of forming a vulcanized rubber molded product showing not only excellent mechanical and electrical properties but also prominently high thermal aging resistance.

DISCLOSURE OF THE INVENTION

A heat-resistant rubber composition according to the invention is a vulcanizable composition comprising:

an ethylene-α-olefin-nonconjugated polyene copolymer rubber (A) composed of ethylene, an α-olefin of 3 to 20 carbon atoms and a nonconjugated polyene, and an organic peroxide (B); and having vulcanizable properties, said ethylene-α-olefin-nonconjugated polyene copolymer rubber (A) having the following properties:

(1) a molar ratio of ethylene to the α-olefin of 3 to 20 carbon atoms is in the range of 40/60 to 95/5 (ethylene/α-olefin), (2) the nonconjugated polyene is 5-vinyl-2-norbornene, 5-isopropenyl-2-norbornene or 5-isobutenyl-2-norbornene, (3) the nonconjugated polyene content is in the range of 0.5 to 50 g/100 g in terms of an iodine value, and (4) an intrinsic viscosity [η], as measured in decalin at 135° C., of 0.1 to 10 dl/g.

The other heat-resistant rubber composition according to the invention is a vulcanizable composition comprising:

[I] an ethylene-α-olefin-nonconjugated polyene copolymer rubber (A) composed of ethylene, an α-olefin of 3 to 20 carbon atoms and a nonconjugated polyene, in an amount of 100 parts by weight,

[II] an amine type anti-aging agent (C) composed of diphenylamines and/or phenylenediamines, in an amount of 0.2 to 5 parts by weight, and/or a hindered phenol type anti-aging agent (D) in an amount of 0.2 to 5 parts by weight,

[III] a sulfur type anti-aging agent (E) in an amount of 1 to 10 parts by weight, and

[IV] an organic peroxide (B);

said ethylene-α-olefin-nonconjugated polyene copolymer rubber (A) having the following properties:

(1) a molar ratio of ethylene to the α-olefin of 3 to 20 carbon atoms is in the range of 40/60 to 95/5 (ethylene/α-olefin), (2) the nonconjugated polyene is 5-vinyl-2-norbornene, 5-isopropenyl-2-norbornene or 5-isobutenyl-2-norbornene, (3) the nonconjugated polyene content is in the range of 0.5 to 50 g/100 g in terms of an iodine value, and (4) an intrinsic viscosity [η], as measured in decalin at 135° C., of 0.1 to 10 dl/g.

The ethylene-α-olefin-nonconjugated polyene copolymer rubber (A) may be an ethylene-α-olefin-nonconjugated polyene copolymer rubber having been graft-modified with an unsaturated carboxylic acid or its derivative.

The ethylene-α-olefin-nonconjugated polyene copolymer rubber (A) may be a blend of:

[I] an ethylene-α-olefin-nonconjugated polyene copolymer rubber (A1) having an intrinsic viscosity [η], as measured in decalin at 135° C., of 1 to 10 dl/g, in an amount of 30 to 95 parts by weight, and

[II] an ethylene-α-olefin-nonconjugated polyene copolymer rubber (A2) having an intrinsic viscosity [η], as measured in decalin at 135° C., of 0.1 to 5 dl/g, this intrinsic viscosity being different from the intrinsic viscosity of the ethylene-α-olefin-nonconjugated polyene copolymer rubber (A1), in an amount of 5 to 70 parts by weight, the total amount of said components (A1) and (A2) being 100 parts by weight.

The ethylene-α-olefin-nonconjugated polyene copolymer rubber (A1) has the following properties:

(1) said copolymer rubber is a copolymer rubber composed of ethylene, an α-olefin of 3 to 20 carbon atoms and a nonconjugated polyene;

(2) a molar ratio of ethylene to the α-olefin of 3 to 20 carbon atoms is in the range of 40/60 to 95/5 (ethylene/α-olefin);

(3) the nonconjugated polyene is 5-vinyl-2-norbornene; and (4) the nonconjugated polyene content is in the range of 0.5 to 50 g/100 g in terms of an iodine value.

The ethylene-α-olefin-nonconjugated polyene copolymer rubber (A2) has the following properties:

(1) said copolymer rubber is a copolymer rubber composed of ethylene, an α-olefin of 3 to 20 carbon atoms and a nonconjugated polyene;

(2) a molar ratio of ethylene to the α-olefin of 3 to 20 carbon atoms is in the range of 40/60 to 95/5 (ethylene/α-olefin);

(3) the nonconjugated polyene is 5-vinyl-2-norbornene, 5-isopropenyl-2-norbornene or 5-isobutenyl-2-norbornene; and (4) the nonconjugated polyene content is in the range of 0.5 to 50 g/100 g in terms of an iodine value.

The ethylene-α-olefin-nonconjugated polyene copolymer rubber (A) which is a blend of the ethylene-α-olefin-nonconjugated polyene copolymer rubber (A1) and the ethylene-α-olefin-nonconjugated polyene copolymer rubber (A2) has:

(i) a Mooney viscosity [$ML_{1+4}$(100° C.)] of 5 to 180, (ii) a molar ratio of ethylene to the α-olefin of 40/60 to 95/5 (ethylene/α-olefin), and (iii) a nonconjugated polyene content of 0.5 to 50 g/100 g in tems of an iodine value.

The ethylene-α-olefin-nonconjugated polyene copolymer rubber (A1) and/or the ethylene-α-olefin-nonconjugated polyene copolymer rubber (A2) may be an ethylene-α-olefin-nonconjugated polyene copolymer rubber having been graft-modified with an unsaturated carboxylic acid or its derivative.

When the ethylene-α-olefin-nonconjugated polyene copolymer rubber (A) which is a blend of the ethylene-α-olefin-nonconjugated polyene copolymer rubber (A1) and the ethylene-α-olefin-nonconjugated polyene copolymer rubber (A2) is used, a vulcanizable heat-resistant rubber composition having extremely good fluidity and capable of forming a vulcanized rubber molded product showing not only excellent mechanical and electrical properties but also prominently high thermal aging resistance and high crosslinking efficiency can be obtained.

BEST MODE FOR CARRYING OUT THE INVENTION

A heat-resistant rubber composition according to the invention is described in detail hereinafter.

A heat-resistant rubber composition according to the invention is a vulcanizable rubber composition comprising:

an ethylene-α-olefin-nonconjugated polyene copolymer rubber (A) and an organic peroxide (B).

The other heat resistant rubber composition of the invention according to the invention is a vulcanizable rubber composition comprising:

[I] an ethylene-α-olefin-nonconjugated polyene copolymer rubber (A),

[II] an amine type anti-aging agent (C) and/or a hindered phenol type anti-aging agent (D),

[III] a sulfur type anti-aging agent (E), and

[IV] an organic peroxide (B).

Ethylene-α-olefin-nonconjugated polyene copolymer rubber (A)

The ethylene-α-olefin-nonconjugated polyene copolymer rubber (A) is a rubber prepared by copolymerizing ethylene, an α-olefin of 3 to 20 carbon atoms and a nonconjugated polyene.

The ethylene-α-olefin-nonconjugated polyene copolymer rubber (A) may be a blend of ethylene-α-olefin-nonconjugated polyene copolymer rubbers (A1) and (A2) each of which is by copolymerizing ethylene, an α-olefin of 3 to 20 carbon atoms and a nonconjugated polyene.

Examples of the α-olefins of 3 to 20 carbon atoms include propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene and 12-ethyl-1-tetradecene. These α-olefins are used singly or in combination of two or more kinds.

Of the above α-olefins, preferred are propylene, 1-butene, 1-hexene, 1-octene and 1-decene.

In the ethylene-α-olefin-nonconjugated polyene copolymer rubbers (A), (A1) and (A2), a molar ratio of ethylene to the α-olefin of 3 to 20 carbon atoms is in the range of 40/60 to 95/5 (ethylene/α-olefin), preferably 50/50 to 90/10, more preferably 55/45 to 85/15, particularly preferably 55/45 to 80/20.

The nonconjugated polyene of the ethylene-α-olefin-nonconjugated polyene copolymer rubber (A1) is 5-vinyl-2-norbornene, and the nonconjugated polyene of the ethylene-α-olefin-nonconjugated polyene copolymer rubber (A2) is 5-vinyl-2-norbornene, 5-isopropyenyl-2-norbornene or 5-isobutenyl-2-norbornene. Any of the nonconjugated polyene is a vinyl end group-containing norbornene compound. used in combination with the following nonconjugated polyene compounds:

chain nonconjugated diene compounds, such as 1,4-hexadiene, 3-methyl-1,4-hexadiene, 4-methyl-1,4-hexadiene, 5-methyl-1,4-hexadiene, 4,5-dimethyl-1,4-hexadiene and 7-methyl-1,6-octadiene;

cyclic nonconjugated diene compounds, such as methyltetrahydroindene, 5-ethylidene-2-norbornene, 5-methylene-2-norbornene, 5-isopropylidene-2-norbornene, 5-vinylidene-2-norbornene and 6-chloromethyl-5-isopropenyl-2-norbornene; and triene compounds, 2,3-diisopropylidene-5-norbornene, 2-ethylidene-3-isopropylidene-5-norbornene and 2-propenyl-2,2-norbornadiene.

The ethylene-α-olefin-nonconjugated polyene copolymer rubber (A) used in the invention has a nonconjugated polyene content of 0.5 to 50, preferably 1 to 40 in terms of an iodine value.

When the nonconjugated polyene content is less than 0.5 in terms of an iodine value, the crosslinking efficiency is lowered. When the nonconjugated polyene content exceeds 50, the resulting rubber composition has poor resistance to environmental deterioration.

The nonconjugated polyene content is an indication of a vulcanizing rate in the vulcanization process. Together with other properties such as an intrinsic viscosity and an ethylene content, the nonconjugated polyene content contributes to the preparation of a copolymer rubber having good fluidity (molding processability) and high strength.

The ethylene-α-olefin-nonconjugated polyene copolymer rubber (A) used in the invention has an intrinsic viscosity [η], as measured in decalin at 135° C., of 0.1 to 10 dl/g, preferably 0.5.to 7 dl/g, more preferably 0.9 to 5 dl/g.

When the ethylene-α-olefin-nonconjugated polyene copolymer rubber (A) having an intrinsic viscosity within the above range is used, a rubber composition showing good fluidity (molding processability) and capable of providing a vulcanized rubber of excellent properties can be obtained.

The intrinsic viscosity [η] is an indication of a molecular weight of the ethylene-α-olefin-nonconjugated polyene copolymer rubber (A). Together with other properties such as the nonconjugated polyene content, the intrinsic viscosity contributes to the preparation of a copolymer rubber having excellent fluidity (molding processability), strength, heat resistance and weathering resistance.

In the blend of the ethylene-α-olefin-nonconjugated polyene copolymer rubbers (A1) and (A2), that is used as the ethylene-α-olefin-nonconjugated polyene copolymer rubber (A), each of the copolymer rubbers (A1) and (A2) has a nonconjugated polyene content of 0.5 to 50, preferably 1 to 40 in terms of an iodine value.

When the ethylene-α-olefin-nonconjugated polyene copolymer rubbers (A1) and (A2) having a nonconjugated polyene content within the above range are used, a rubber composition capable of providing a vulcanized rubber molded product of prominently high thermal aging resistance can be obtained.

The ethylene-α-olefin-nonconjugated polyene copolymer rubber (A1) has an intrinsic viscosity [η], as measured in decalin at 135° C., of 1 to 10 dl/g, preferably 2 to 6 dl/g, more preferably 3 to 5 dl/g.

When the ethylene-α-olefin-nonconjugated polyene copolymer rubber (A1) having an intrinsic viscosity within the above range is used, a rubber composition showing good fluidity (molding processability) and capable of providing a vulcanized rubber of excellent properties can be obtained.

The ethylene-α-olefin-nonconjugated polyene copolymer rubber (A2) has an intrinsic viscosity [η], as measured in decalin at 135° C. of 0 1 to 5 dl/g, preferably 0.2 to 2 dl/g, more preferably 0.3 to 1 dl/g.

By blending the ethylene-α-olefin-nonconjugated polyene copolymer rubber (A2) having an intrinsic viscosity within the above range and the ethylene-α-olefin-nonconjugated polyene copolymer rubber (A1), a rubber composition showing good fluidity (molding processability) and capable of providing a vulcanized rubber of excellent properties can be obtained.

The blend of the ethylene-α-olefin-nonconjugated polyene copolymer rubbers (A1) and (A2) has a Mooney viscosity [$ML_{1+4}$(100° C.)] of 5 to 180, a molar ratio of ethylene to the α-olefin of 40/60 to 95/5 (ethylene/α-olefin), and a polyene content of 0.5 to 50 in terms of an iodine value.

The ethylene-α-olefin-nonconjugated polyene copolymer rubbers (A), (A1) and (A2) can be prepared by processes described in, for example, Japanese Patent Publication No. 14497/1984. That is, the ethylene-α-olefin-nonconjugated polyene copolymer rubbers (A), (A1) and (A2) can be obtained by copolymerizing ethylene, the α-olefin of 3 to 20 carbon atoms and the nonconjugated polyene in the presence of Ziegler catalyst using hydrogen as a molecular weight modifier.

The ethylene-α-olefin-nonconjugated polyene copolymer rubbers (A), (A1) and (A2) may be graft-modified products obtained by graft-modifying the above-described ethylene-α-olefin-nonconjugated polyene copolymer rubbers with unsaturated carboxylic acids or their derivatives (acid anhydrides, esters).

Examples of the unsaturated carboxylic acids include acrylic acid, methacrylic acid, maleic acid, fumaric acid, itaconic acid, citraconic acid, tetrahydrophthalic acid and bicyclo(2,2,1)hepto-2-ene-5,6-dicarboxylic acid.

Examples of the unsaturated carboxylic anhydrides include maleic anhydride, itaconic anhydride, citraconic anhydride, tetrahydrophthalic anhydride and bicyclo(2,2,1)hepto-2-ene-5,6-dicarboxylic anhydride.

Of these, preferred is maleic acid.

Examples of the unsaturated carboxylic esters include methyl acrylate, methyl methacrylate, dimethyl maleate, monomethyl maleate, dimethyl fumarate, dimethyl itaconate, diethyl citraconate, dimethyl tetrahydrophthalate and dimethyl bi(cyclo(2,2,1)hepto-2-ene-5,6-dicarboxylate. Of these, preferred are methyl acrylate and ethyl acrylate.

The graft modifiers (graft monomers) such as the unsaturated carboxylic acids are used singly or in combination of two or more kinds. In any case, the graft quantity is preferably not more than 0.1 mol based on 100 g of the aforementioned unmodified ethylene-α-olefin-nonconjugated polyene copolymer rubber.

When the ethylene-α-olefin-nonconjugated polyene copolymer rubbers (A), (A1) and (A2) having a graft quantity within the above range are used, a rubber composition showing good fluidity (molding processability) and capable of providing a vulcanized rubber molded product of excellent low-temperature resistance can be obtained.

The graft-modified ethylene-α-olefin-nonconjugated polyene copolymer rubber can be obtained by causing the unmodified ethylene-α-olefin-nonconjugated polyene copolymer rubber to react with the unsaturated carboxylic acid or its derivative in the presence of a radical initiator.

This graft reaction can be carried out in a solution state or a molten state. When the graft reaction is performed in the molten state, it is most efficient and preferred to continuously perform the reaction in an extruder.

Examples of the radical initiators used for the graft reaction include:

dialkyl peroxides, such as dicumyl peroxide, di-t-butyl peroxide, di-t-butylperoxy-3,3,5-trimethylcyclohexane, t-butylcumyl peroxide, di-t-amyl peroxide, t-butyl hydroperoxide, 2,5-dimethyl-2,5-di(t-butylperoxyne)hexyne-3,2,5-dimethyl-2,5-di(benzoylperoxy)hexane, 2,5-dimethyl-2,5-mono(t-butylperoxy)hexane and α,α'-bis(t-butylperoxy-m-isopropyl)benzene;

peroxy esters, such as t-butyl peroxyacetate, t-butyl peroxyisobutyrate, t-butyl peroxypivalate, t-butyl peroxymaleate, t-butyl peroxyneodecanoate, t-butyl peroxybenzoate and di-t-butyl peroxyphthalate;

ketone peroxides, such as dicylohexanone peroxide; and mixtures of these compounds.

Of these, preferred are organic peroxides having a temperature, at which the half-life period thereof corresponds to one minute, of 130° to 200° C., and among them particularly preferred are dicumyl peroxide, di-t-butyl peroxide, di-t-butylperoxy-3,3,5-trimethylcyclohexane, t-butylcumyl peroxide, di-t-amyl peroxide and t-butyl hydroperoxide.

In the present invention, the ethylene-α-olefin-nonconjugated polyene copolymer rubbers (A), (A1) and (A2) having a Mooney viscosity [$ML_{1+4}$(100° C.)] of 5 to 180, particularly 10 to 120, are preferably used from the viewpoints of mechanical properties and fluidity molding processability).

In the blend of the ethylene-α-olefin-nonconjugated polyene copolymer rubber (A1) and the ethylene-α-olefin-nonconjugated polyene copolymer rubber (A2), that is used as the ethylene-α-olefin-nonconjugated polyene copolymer rubber (A), the ethylene-α-olefin-nonconjugated polyene copolymer rubber (A1) is used in an amount of 30 to 95 parts by weight, preferably 35 to 80 parts by weight, more preferably 40 to 70 parts by weight, based on 100 parts by weight of the total amount of the ethylene-α-olefin-nonconjugated polyene copolymer rubber (A1) and the ethylene-α-olefin-nonconjugated polyene copolymer rubber (A2); and the ethylene-α-olefin-nonconjugated polyene copolymer rubber (A2) is used in an amount of 5 to 70 parts by weight, preferably 10 to 65 parts by weight, more preferably 20 to 60 parts by weight, based on 100 parts by weight of the total amount of the ethylene-α-olefin-nonconjugated polyene copolymer rubber (A1) and the ethylene-α-olefin-nonconjugated polyene copolymer rubber (A2).

Organic peroxide (B)

The organic peroxide used in the invention is an organic peroxide which is conventionally used for rubbers.

Examples of the organic peroxides include:

dialkyl peroxides, such as dicumyl peroxide, di-t-butyl peroxide, di-t-butylperoxy-3,3,5-trimethylcyclohexane, t-butylcumyl peroxide, di-t-amyl peroxide, t-butyl hydroperoxide, 2,5-dimethyl-2,5-di(t-butylperoxyne)hexyne-3, 2,5-dimethyl-2,5-di(benzoylperoxy)hexane, 2,5-dimethyl-2,5-mono(t-butylperoxy)hexane and 5, α,α'-bis(t-butylperoxy-m-isopropyl)benzene;

peroxy esters, such as t-butyl peroxyacetate, t-butyl peroxyisobutyrate, t-butyl peroxypivalate, t-butylperoxymaleic acid, t-butyl peroxyneodecanoate, t-butyl peroxybenzoate and di-t-butyl peroxyphthalate;

ketone peroxides, such as dicyclohexanone peroxide; and mixtures of these compounds.

Of these, preferred are organic peroxides having a temperature, at which the half-life period thereof corresponds to one minute, of 130° to 200° C., and among them, particularly preferred are dicumyl peroxide, di-t-butyl peroxide, di-t-butylperoxy-3,3,5-trimethylcyclohexane, t-butylcumyl peroxide, di-t-amyl peroxide and t-butyl hydroperoxide.

The organic peroxide is used in an amount of 0.0003 to 0.05 mol, preferably 0.001 to 0.03 mol, based on 100 g of the ethylene-α-olefin-nonconjugated polyene copolymer rubber (A), but it is desired that the optimum amount is properly determined according the required property values.

When the organic peroxide is used as a vulcanizing agent, a vulcanization aid is preferably used in combination. Examples of the vulcanization aids include sulfur; quinonedioxime compounds, such as p-quinonedioxime; methacrylate compounds, such as polyethylene glycol dimethacrylate; allyl compounds, such as diallyl phthalate and triallyl cyanurate; maleimide compounds; and divinyl benzene. The vulcanization aid is used in an amount of 0.5 to 2 mol based on 1 mol of the organic peroxide, preferably in an equimolar amount.

Amine type anti-aging agent (C)

In the present invention, diphenylamines and/or phenylenediamines are used as the amine type anti-aging agent (C).

Examples of the diphenylamines include p-(p-toluenesulfonylamide)-diphenylamine, 4,4'-(α,α'-dimethylbenzyl)diphenylamine, 4,4'-dioctyldiphenylamine, a high-temperature reaction product of diphenylamine and acetone, a low-temperature reaction product of diphenylamine and acetone, a low-temperature reaction product of diphenylamine, aniline and acetone, a reaction product of diphenylamine and diisobutylene, octylated diphenylamine, dioctylated diphenylamine, p,p'-dioctyldiphenylamine and alkylated diphenylamine.

Examples of the phenylenediamines include p-phenylenediamines, such as N,N'-diphenyl-p-phenylenediamine, n-isopropyl-N'-phenyl-p-phenylenediamine, N,N'-di-2-naphthyl-p-phenylenediamine, N-cyclohexyl-N'-phenyl-p-phenylenediamine, N-phenyl-N'-(3-methacryloyloxy-2-hydroxypropyl)-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-bis(1,3-dimethylbutyl)-N'-phenyl-p-phenylenediamine, phenylhexyl-p-phenylenediamine and phenyloctyl-p-phenylenediamine.

Of these, particularly preferred are 4,4'-(α,α'-dimethylbenzyl)diphenylamine and N,N'-di-2-naphthyl-p-phenylenediamine.

These compounds can be used singly or in combination of two or more kinds.

In the present invention, the amine type anti-aging agent (C) is used in an amount of 0.2 to 5 parts by weight, preferably 0.5 to 4 parts by weight, more preferably 1 to 3 parts by weight, based on 100 parts by weight of the ethylene-α-olefin-nonconjugated polyene copolymer rubber (A). When the amine type anti-aging agent (C) is used in the above-mentioned amount, the thermal aging resistance can be highly improved, and crosslinking of the ethylene-α-olefin-nonconjugated polyene copolymer rubber (A) is not inhibited.

Hindered phenol type anti-aging agent (D)

Examples of the hindered phenol type anti-aging agents (D) include:

(1) 1,1,3-tris(2-methyl-4-hydroxy-5-t-butylphenylbutane), (2) 4,4'-butylidene-bis(3-methyl-6-t-butylphenol), (3) 2,2-thiobis(4-methyl-6-t-butylphenol), (4) 7-octadecyl-3-(4'-hydroxy-3',5'-di-t-butylphenyl) propionate, (5) tetrakis[methylene-3-(3',5'-di-t-butyl-4'-hydroxyphenyl)propionate]methane, (6) pentaerythritol-tetrakis[3-(3,5-di-t-butyl-4-hydroxyphenyl)propionate], (7) triethylene glycol-bis[3-(3-t-butyl-5-methyl-4-hydroxyphenyl)propionate], (8) 1,6-hexanediol-bis[3-(3,5-di-t-butyl-4-hydroxyphenyl)propionate], (9) 2,4-bis(n-octylthio)-6-(4-hydroxy-3,5-di-t-butylanilino)-1,3,5-triazine,

(10) tris-(3,5-di-t-butyl-4-hydroxybenzyl)isocyanurate,

(11) 2,2-thio-diethylenebis[3-(3,5-di-t-butyl-4-hydroxyphenyl)propionate],

(12) N,N'-hexamethylenebis(3,5-di-t-butyl-4-hydroxy)hydrocinnmamide,

(13) 2,4-bis[(octylthio) methyl]-o-cresol,

(14) 3,5-di-t-butyl-4-hydroxybenzyl-phosphonate-diethyl ester

(15) tetrakis[methylene (3,5-di-t-butyl-4-hydroxyhydrocinnamate)]methane,

(16) octadecyl-3-(3,5-di-t-butyl-4-hydroxyphenyl) propionate, and

(17) 3,9-bis[2-{3(3-t-butyl-4-hydroxy-5-methylphenyl) propionyloxy}-1,1-dimethylethyl]-2,4-8,10-tetraoxaspiro[5,5]undecane.

Of these, preferred are the above phenol compounds (5) and (17).

In the present invention, the hindered phenol type anti-aging agent (D) is used in an amount of 0.2 to 5 parts by weight, preferably 0.5 to 4 parts by weight, more preferably 1 to 3 parts by weight, based on 100 parts by weight of the ethylene-α-olefin-nonconjugated polyene copolymer rubber (A). When the hindered phenol type anti-aging agent (D) is used in the above-mentioned amount, the thermal aging resistance can be highly improved, and crosslinking of the ethylene-α-olefin-nonconjugated polyene copolymer rubber (A) is not inhibited.

Sulfur type anti-aging agent (E)

The sulfur type anti-aging agent (E) used in the invention is a sulfur type anti-aging agent which is conventionally used for rubbers.

Examples of the sulfur type anti-aging agents (E) include those of imidazole type, such as 2-mercaptobenzimidazole, zinc salt of 2-mercaptobenzimidazole, 2-mercaptomethylbenzimidazole and zinc salt of 2-mercaptomethylbenzimidazole; and those of aliphatic thioether type, such as dimyristyl thiodipropionate, dilauryl thiodipropionate, distearyl thiodipropionate and ditridecyl thiodipropionate, pentaerythritol-tetrakis-(β-lauryl-thiopropionate). Of these, particularly preferred are 2-mercagtobenzimidazole, zinc salt of 2-mercaptobenzimidazole, 2-mercaptomethylbenzimidazole, zinc salt of 2-mercaptomethylbenzimidazole and pentaerythritol-tetrakis-(β-lauryl-thiopropionate).

In the present invention, the sulfur type anti-aging agent (E) is used in an amount of 1 to 10 parts by weight, preferably 0.5 to 8 parts by weight, more preferably 1 to 6 parts by weight, based on 100 parts by weight of the ethylene-α-olefin-nonconjugated polyene copolymer rubber (A). When the sulfur type anti-aging agent (E) is used in the above-mentioned amount, the thermal aging resistance can be highly improved, and crosslinking of the ethylene-α-olefin-nonconjugated polyene copolymer rubber (A) is not inhibited.

Other compounding ingredients

The heat-resistant rubber composition according to the invention can be used in an unvulcanized state, but when it is used in the form of a vulcanized product such as a vulcanized rubber molded product or a vulcanized rubber foamed product, its properties are most conspicuously exhibited.

To the heat-resistant rubber composition of the invention, known additives such as rubber reinforcement, softener, vulcanization aid, processing aid, foaming agent, foaming aid, colorant, dispersant and flame retardant can be added according to the use of the aimed vulcanized product, in addition to the ethylene-α-olefin-nonconjugated polyene copolymer rubber (A), the organic peroxide (B), if necessary, the amine type anti-aging agent (C) and/or the hindered phenol type anti-aging agent (E), and the sulfur type anti-aging agent (E).

The total amount of the ethylene-α-olefin-nonconjugated polyene copolymer rubber (A), the amine type anti-aging agent (C), the hindered phenol type anti-aging agent (D) and the sulfur type anti-aging agent (E) in the rubber composition is usually not less than 25% by weight, preferably not less than 40% by weight, though it varies depending on the uses.

The rubber reinforcement serves to enhance mechanical properties such as tensile strength, tear strength and abrasion resistance of the vulcanized rubber. Examples of the rubber reinforcements include carbon black such as SRF, GPF, FEF, MAF, HAF, ISAF, SAF, FT and MT, carbon black thereof which are surface-treated with, for example, silane coupling agents, silica, activated calcium carbonate, powdery talc and powdery silicic acid.

Though the amount of the rubber reinforcement can be selected according to the use of the vulcanized rubber, the amount thereof is usually not more than 200 parts by weight, particularly not more than 100 parts by weight, based on 100 parts by weight of the total amount of the ethylene-α-olefin-nonconjugated polyene copolymer rubber (A), the amine type anti-aging agent (C), the hindered phenol type anti-aging agent (D) and the sulfur type anti-aging agent (E).

As the softeners, those conventionally used for rubbers are employable, and examples thereof include:

petroleum type softening agents, such as process oil, lubricating oil, paraffin, liquid paraffin, petroleum asphalt and vaseline;

coal tar type softeners, such as coal tar and coal tar pitch;

fatty oil type softeners, such as castor oil, linseed oil, rapeseed oil and coconut oil;

tall oil;

factice;

waxes, such as beeswax, carnauba wax and lanolin;

fatty acids and fatty acid salts, such as ricinolic acid, palmitic acid, barium stearate, calcium stearate and zinc laurate; and synthetic polymer materials, such as petroleum resin, atactic polypropylene and coumarone-indene resin.

Of these, preferred are petroleum type softeners, and among them, particularly preferred is process oil.

Though the amount of the softener can be selected according to the use of the vulcanized rubber, but the amount thereof is usually not more than 200 parts by weight, particularly not more than 100 parts by weight, based on 100 parts by weight of the total amount of the ethylene-α-olefin-nonconjugated polyene copolymer rubber (A), the amine type anti-aging agent (C), the hindered phenol type anti-aging agent (D) and the sulfur type anti-aging agent (E).

When electron rays are used for the vulcanization instead of using the vulcanizing agent, the unvulcanized compounded rubber is irradiated with the electron rays having energy of 0.1 to 10 MeV (megaelectron volt), preferably 0.3 to 2 MeV, in such a manner that the absorbed dose becomes 0.5 to 35 Mrad (megarad), preferably 0.5 to 10 Mrad.

In this case, the vulcanization aid, that is used in combination with the organic peroxide (vulcanizing agent), may be used. The vulcanization aid is used in an amount of 0.0001 to 0.1 mol, preferably 0.001 to 0.03 mol, based on 100 g of the ethylene-α-olefin-nonconjugated polyene copolymer rubber (A).

As the processing aids, those conventionally used for rubbers are employable, and examples thereof include higher fatty acids, such as ricinolic acid, stearic acid, palmitic acid and lauric acid; salts of higher fatty acids, such as barium stearate, zinc stearate and calcium stearate; and esters of higher fatty acids, such as recinolic acid ester, stearic acid ester, palmitic acid ester and lauric acid ester.

The processing aid is used in an amount of not more than 10 parts by weight, preferably not more than 5 parts by weight, based on 100 parts by weight of the ethylene-α-olefin-nonconjugated polyene copolymer rubber (A), but it is desired that the optimum amount is properly determined according the required property values.

Examples of the foaming agents include:

inorganic foaming agents, such as sodium bicarbonate, sodium carbonate, ammonium bicarbonate, ammonium carbonate and ammonium nitrite;

nitroso compounds, such as N,N'-dimethyl-N,N'-dinitrosoterephthalamide and N,N'-dinitrosopentamethylenetetramine;

azo compounds, such as azodicarbonamide, azobisisobutyronitrile, azocyclohexylnitrile, azodiaminobenzene and barium azodicarboxylate;

sulfonylhydrazide compounds, such as benzenesulfonylhydrazide, toluenesulfonylhydrazide, p,p'-oxybis(benzenesulfonylhydrazide) and diphenylsulfone-3,3'-disulfonylhydrazide; and azide compounds, such as calcium azide, 4,4-diphenyldisulfonylazide and p-toluenesulfonylazide.

The foaming agent is used in an amount of 0.5 to 30 parts by weight, preferably 1 to 20 parts by weight, based on 100 parts by weight of the ethylene-α-olefin-nonconjugated polyene copolymer rubber (A). When the foaming agent is used in the above-mentioned amount, a foamed product having an apparent specific gravity of 0.03 to 0.8 g/cm$^3$ can be obtained. However, it is desired that the optimum amount is properly determined according the required property values.

A foaming aid may be used in combination with the foaming agent, if desired. The foaming aid has functions of lowering a decomposition temperature of the foaming agent, acceleration of decomposition and production of uniform foam.

Examples of the foaming aids include organic acids, such as salicylic acid, phthalic acid, stearic acid and oxalic acid, urea and its derivative.

The foaming aid is used in an amount of 0.01 to 10 parts by weight, preferably 0.1 to 5 parts by weight, based on 100 parts by weight of the ethylene-α-olefin-nonconjugated polyene copolymer rubber (A), but it is desired that the optimum amount is properly determined according the required property values.

Preparation of rubber composition

As described hereinbefore, the heat-resistant rubber composition of the invention can be used in the unvulcanized state, but when it is used in the form of a vulcanized product such as a vulcanized rubber molded product or a vulcanized rubber foamed product, its properties are most conspicuously exhibited.

For preparing a vulcanizate from the heat-resistant rubber composition of the invention, an unvulcanized compounded rubber is first prepared, then the compounded rubber is molded into a product of desired shape, and the product is vulcanized, similarly to a method of vulcanizing conventional rubbers.

For the vulcanization, any of a heating method using a vulcanizing agent and an electron ray-irradiation method may be adopted.

The heat-resistant rubber composition of the invention can be prepared by, for example, the following process.

That is, the ethylene-α-olefin-nonconjugated polyene copolymer rubber (A), and if necessary, additives such as filler and softener are kneaded at 80° to 170° C. for 3 to 10 minutes using internal mixers (closed type mixers) such as Banbury mixer, kneader and intermixer; then the organic peroxide (vulcanizing agent), and if necessary, the vulcanization aid and the foaming agent are added; and the resulting mixture is kneaded at a roll temperature of 40° to 80° C. for 5 to 30 minutes using rolls (e.g., open rolls) or kneaders, followed by rolling.

The heat-resistant rubber composition of the invention comprising the anti-aging agent can be prepared by kneading the ethylene-α-olefin-nonconjugated polyene copolymer rubber (A), the amine type anti-aging agent (C), the hindered phenol type anti-aging agent (D), the sulfur type anti-aging agent (E), and if necessary, additives such as filler and softener at 80° to 170° C. for 3 to 10 minutes using internal mixers (closed type mixers) such as Banbury mixer, kneader or intermixer; then adding the organic peroxide (B) (vulcanizing agent), and if necessary, the vulcanization aid and the foaming agent; and kneading the resulting mixture at a roll temperature of 40° to 80° C. for 5 to 30 minutes using rolls (e.g., open rolls) or kneaders, followed by rolling.

If the kneading temperature of the internal mixer is low, the anti-aging agents (C), (D) and (E), the vulcanizing agent, and other additives such as colorant, dispersant, flame retardant and foaming agent may be kneaded together with the ethylene-α-olefin-nonconjugated polyene copolymer rubber (A) and additives such as filler and softener.

The vulcanizable heat-resistant rubber composition of the invention obtained as above is molded into a desired shape using various means such as an extrusion molding machine, a calender roll, a press, an injection molding machine or a transfer molding machine, and simultaneously or thereafter the molded product is heated at a temperature of 120° to 270° C. for 1 to 30 minutes in a vulcanizing bath to perform vulcanization. Or, the vulcanized product can be obtained by irradiation to it with electron rays in the aforesaid manner. In the vulcanization, a mold may be used or may not be used. When a mold is not used, the vulcanization is generally carried out continuously. The heating in the vulcanizing bath can be performed by the use of heating means such as hot air, glass bead fluidized bed, UHF (ultrahigh frequency electromagnetic wave), steam or LCM (molten salt bath). In the vulcanization using irradiation with electron rays, a compounded rubber containing no vulcanizing agent is used.

EFFECT OF THE INVENTION

A heat-resistant rubber composition of the invention comprises the specific ethylene-α-olefin-nonconjugated polyene copolymer rubber (A) and the organic peroxide (B). Therefore, the composition has high crosslinking efficiency and a high modulus, and can provide a vulcanized rubber molded product having excellent resistance to environmental deterioration such as thermal aging resistance.

The other heat-resistant rubber composition of the invention comprises the specific ethylene-α-olefin-nonconjugated polyene copolymer rubber (A), the amine type anti-aging agent (C) and/or the hindered phenol type anti-aging agent (E), the sulfur type anti-aging agent (E) and the organic peroxide (B). Therefore, the composition can provide a vulcanized rubber molded product showing not only excellent mechanical and electrical properties but also prominently high thermal aging resistance. These effects can be obtained by the use of a combination of the amine type anti-aging agent (C) and the sulfur type anti-aging agent (E), a combination of the hindered phenol type anti-aging agent (D) and the sulfur type anti-aging agent (E), or a combination of the amine type anti-aging agent (C), the hindered phenol type anti-aging agent (D) and the sulfur type anti-aging agent (E).

Among the heat-resistant composition of the invention, a composition comprising ethylene-α-olefin-nonconjugated polyene copolymer rubber (A) containing a blend of specific amounts of the ethylene-α-olefin-nonconjugated polyene copolymer rubbers (A1) and (A2) having different intrinsic viscosities (i.e., having different molecular weights) particularly has extremely good fluidity (molding processability) and can provide a vulcanized rubber molded product showing not only excellent mechanical and electrical properties but also prominently high thermal aging resistance.

Accordingly, the heat-resistant rubber composition which exerts such effects as mentioned above can be favorably used for automotive parts such as weatherstrip, door glass run channel, window frame, radiator hose, brake parts and wiper blade; industrial rubber parts such as rubber roll, belt, packing and hose; electrical insulating materials such as anode cap and grommet; and building materials such as building gasket.

EXAMPLE

The present invention will be further described with reference to the following examples, but it should be construed that the invention is in no way limited to those examples.

Example 1

At first, the ingredients shown in Table 1 were kneaded at 140°–150° C. for 5 minutes using a 1.7 liter Banbury mixer to prepare a blend (1).

TABLE 1

| Ingredient | Amount (Parts by weight) |
| --- | --- |
| EPT rubber (A component) *1 | 100 |
| Zinc white *2 | 5 |
| Stearic acid *3 | 1 |
| HAF carbon black *4 | 50 |
| Softener *5 | 10 |
| Activator *6 | 1 |
| Hindered phenol anti-aging agent *7 | 2 |
| Sulfur anti-aging agent *8 | 4 |

*1 Ethylene-propylene-5-vinyl-2-norbornene copolymer rubber (1) having a molar ratio of ethylene to propylene (ethylene/propylene by mol): 68/32; an intrinsic viscosity [η], as measured in decalin at 135° C.: 2.2 dl/g; and an iodine value: 3.
*2: available from Sakai Chemical Industry Co., Ltd.
*3: Tsubaki (Trade Mark) available from NOF Corporation
*4: Asahi #70 (Trade Mark) available from Asahi Carbon, Ltd.
*5: Diana Process oil PW 380 (Trade Mark) available from Idemitu Kosan, Co., Ltd.
*6: Polyethylene glycol, Molecular weight = 4000
*7: Irganox 1010 (Trade Mark), available from Ciba Geigy, Ltd.
*8: NOCRAC MB (Trade Mark), Ouchi-Shinko Chemical Industry Co., Ltd.

Next, a rubber composition containing the resulting blend (HA1) was wound around 8 inch open rolls (a product of NIHON ROLL K.K.). To the composition on the open roll, the ingredients shown in Table 2 were added in accordance with the formulation as shown in Table 2 and kneaded for 3 minutes, followed by sheeting to prepare a sheet of a blend (HA2) having a thickness of 3 mm. In this operation, the surface temperature of the front roll was 50° C. and that of the back roll was 60° C.

TABLE 2

| Ingredient | Amount (Parts by weight) |
| --- | --- |
| Blend (HA2) | 173 |
| Organic peroxide (B component) *9 | 7.0 |
| Cross-linking assistant *10 | 4.0 |

*9: Mitsui DCO-40C (Trade Mark), available from Mitsui Pertrochemical Industries, Ltd. Dicumyl peroxide (concentration 40%)
*10: TAIC (Trade Mark) available from Nihon Kasei, Ltd.

The resulting blend was heated at a molding temperature 170° C. for 20 minutes by means of a press molding apparatus (a product of KOHTAKI SEIKI K.K.) to prepare a vulcanized rubber sheet having a thickness of 2 mm. The resulting sheet was evaluated in modulus, tensile properties, cross-linking density and aging properties.

The methods for measuring these properties are as described below.

(1) Modulus

Tensile test in accordance with JIS K 6301 was carried out at a measuring temperature of 25° C. at a pulling rate of 500 mm/min. and the modulus $M_{200}$ at 200% elongation was measured.

(2) Tensile Properties

Tensile test in accordance with JIS K 6301 was carried out at a measuring temperature of 25° C. at a pulling rate of 500 mm/min., and elongation ($E_B$) and strength ($T_B$) at rupture of the vulcanized sheet were measured.

(3) Effective Network Chain Density (an index of crosslinking density)

In accordance with JIS K 6301, the vulcanized sheet was immersed in toluene at 37° C. and the effective network chain density was calculated by the following formula.

$$v(cc^{-1}) = (v_R + ln(1-v_R) + \mu v_R^2)/(-V_0(v_R^{1/3} - v_R/2)$$

$v_R$: Volume ratio of a pure rubber to the volume of the swelled pure rubber in the swelled vulcanized rubber (i.e., to the volume of pure rubber+absorbed solvent).

$\mu$: Rubber-solvent interaction coefficient (using data disclosed in JSR HANDBOOK published by Japan Synthetic Rubber Co.)

$V_0$: Molar volume of solvent $v(cc^{-1})$: Effective network chain concentration. The number of effective network chains in 1 cc of the pure rubber (4) Aging properties In accordance with JIS K 6301, the vulcanized sheet was allowed to age in an oven at 175° C. for 168 hours. Then, the sheet was subjected to the tensile test at a measuring temperature of 25° C. at a pulling rate of 500 m/min. to measure elongation ($E_B$) and strength ($T_B$) at rupture of the vulcanized sheet. From the measurements, a tensile strength retention ratio $A_R(T_B)$ and an elongation retention ratio $A_R(E_B)$ were calculated.

The results are set forth in Table 3.

Example 2

Example 1 was repeated except that Kayacumyl AD-40 (trade name) available from KAYAKUAKZO Co. was used as the organic peroxide (B).

The results are set forth in Table 3.

Example 3

Example 1 was repeated except that the ethylene-propylene-5-vinyl-2-norbornene copolymer rubber (2) described below was used in place of the ethylene-propylene-5-vinyl-2-norbornene copolymer rubber (1) in Example 1.

Ethylene-propylene-5-vinyl-2-norbornene copolymer rubber (2):

Ethylene/propylene (by mol): 68/32

Intrinsic viscosity [η] measured in decalin at 135° C.: 2.6 dl/g

Iodide value=3

The results are set forth in Table 3.

Example 4

Example 1 was repeated except that the ethylene-propylene-5-vinyl-2-norbornene copolymer rubber (3) described below was used in place of the ethylene-propylene-5-vinyl-2-norbornene copolymer rubber (1) in Example 1.

Ethylene-propylene-5-vinyl-2-norbornene copolymer rubber (3):

Ethylene/propylene (by mol): 74/26

Intrinsic viscosity [η] measured in decalin at 135° C.: 2.2 dl/g

Iodide value=5

The results are set forth in Table 3.

Example 5

Example 1 was repeated except that the ethylene-propylene-5-vinyl-2-norbornene copolymer rubber (4) described below was used in place of the ethylene-propylene-5-vinyl-2-norbornene copolymer rubber (1) in Example 1.

Ethylene-propylene-5-vinyl-2-norbornene copolymer rubber (4):

Ethylene/propylene (by mol): 58/42

Intrinsic viscosity [η] measured in decalin at 135° C.: 2.2 dl/g

Iodide value=4

The results are set forth in Table 3.

Example 6

Example 1 was repeated except that the ethylene-propylene-5-vinyl-2-norbornene copolymer rubber (5) described below was used in place of the ethylene-propylene-5-vinyl-2-norbornene copolymer rubber (1) in Example 1.

Ethylene-propylene-5-vinyl-2-norbornene copolymer rubber (5):

Ethylene/propylene (by mol): 74/26

Intrinsic viscosity [η] measured in decalin at 135° C.: 2.2 dl/g

Iodide value=10

The results are set forth in Table 3.

Example 7

Example 1 was repeated except that the ethylene-1-butene-5-vinyl-2-norbornene copolymer rubber (6) described below was used in place of the ethylene-propylene-5-vinyl-2-norbornene copolymer rubber (1) in Example 1.

Ethylene-1-butene-5-vinyl-2-norbornene copolymer rubber (6):

Ethylene/1-butene (by mol): 80/20

Intrinsic viscosity [η] measured in decalin at 135° C.: 3.0 dl/g

Iodide value=5

The results are set forth in Table 3.

Comparative Example 1

Example 1 was repeated except that the ethylene-propylene copolymer rubber (7) described below was used in place of the ethylene-propylene-5-vinyl-2-norbornene copolymer rubber (1) in Example 1.

Ethylene-propylene copolymer rubber (7):

Ethylene/propylene (by mol): 58/42

Intrinsic viscosity [η] measured in decalin at 135° C.: 2.4 dl/g iodide value=0

The results are set forth in Table 3.

Comparative Example 2

Example 1 was repeated except that the ethylene-propylene copolymer rubber (8) described below was used in place of the ethylene-propylene-5-vinyl-2-norbornene copolymer rubber (1) in Example 1.

Ethylene-propylene copolymer rubber (8):

Ethylene/propylene (by mol): 70/30

Intrinsic viscosity [η] measured in decalin at 135° C.: 2.4 dl/g

25 Iodide value=0

The results are set forth in Table 3.

Comparative Example 3

Example 6 was repeated except that 1.5 phr of sulfer, and 0.5 phr of Nocceller M (trade name, available from Ouchi-Shinko Chemical industry Co., Ltd.) and 1.0 phr of Nocceller TT (trade name, available from Ouchi-Shinko Chemical Industry Co., Ltd.) as the vulcanizing accelerators were used in place of the organic peroxide and the crosslinking assistant in Example 6.

The results are set forth in Table 3.

Comparative Example 4

Example 1 was repeated except that the ethylene-propylene-5-ethylidene-2-norbornene copolymer rubber (9) described below was used in place of the ethylene-propylene-5-vinyl-2-norbornene copolymer rubber (1) in Example 1.

Ethylene-propylene-5-ethylidene-2-norbornene copolymer rubber (9):

Ethylene/propylene (by mol): 68/32

Intrinsic viscosity [η] measured in decalin at 135° C.: 2.2 dl/g

Iodide value=6

The results are set forth in Table 3.

Comparative Example 5

Example 1 was repeated except that the ethylene-propylene-5-ethylidene-2-norbornene copolymer rubber (10) described below was used in place of the ethylene-propylene-5-vinylidene-2-norbornene copolymer rubber (1) in Example 1.

Ethylene-propylene-5-ethylidene-2-norbornene copolymer rubber (10):

Ethylene/propylene (by mol): 66/34

Intrinsic viscosity [η] measured in decalin at 135° C.: 2.2 dl/g

Iodide value=13

The results are set forth in Table 3.

Comparative Example 6

Example 1 was repeated except that the ethylene-propylene-5-ethylidene-2-norbornene copolymer rubber (11) described below was used in place of the ethylene-propylene-5-vinyl-2-norbornene copolymer rubber (1) in Example 1.

Ethylene-propylene-5-ethylidene-2-norbornene copolymer rubber (11):

Ethylene/propylene (by mol): 66/34

Intrinsic viscosity [η] measured in decalin at 135° C.: 2.2 dl/g

Iodide value=22

The results are set forth in Table 3.

Comparative Example 7

Example 1 was repeated except that the ethylene-propylene-dicyclopentadiene copolymer rubber (12) described below was used in place of the ethylene-propylene-5-vinyl-2-norbornene copolymer rubber (1) in Example 1.

Ethylene-propylene-dicyclopentadiene copolymer rubber (12):

Ethylene/propylene (by mol): 68/32

Intrinsic viscosity [η] measured in decalin at 135° C.: 2.2 dl/g

Iodide value=6

The results are set forth in Table 3.

Comparative Example 8

Example 1 was repeated except that the ethylene-propylene-dicyclopentadiene copolymer rubber (13) described below was used in place of the ethylene-propylene-5-vinyl-2-norbornene copolymer rubber (1) in Example 1.

Ethylene-propylene-dicyclopentadiene copolymer rubber (13):

Ethylene/propylene (by mol): 66/34

Intrinsic viscosity [η] measured in decalin at 135° C.: 2.2 dl/g

Iodide value=10

The results are set forth in Table 3.

Comparative Example 9

Example 1 was repeated except that the ethylene-propylene-1,4-hexadiene copolymer rubber (14) described below was used in place of the ethylene-propylene-5-vinyl-2-norbornene copolymer rubber (1) in Example 1.

Ethylene-propylene-1,4-hexadiene copolymer rubber (14):

Ethylene/propylene (by mol): 66/34

Intrinsic viscosity [η] measured in decalin at 135° C.: 2.2 dl/g

Iodide value=6

The results are set forth in Table 3.

Comparative Example 10

Example 1 was repeated except that the ethylene-propylene-1,4-hexadiene copolymer rubber (15) described below was used in place of the ethylene-propylene-5-vinyl-2-norbornene copolymer rubber (1) in Example 1.

Ethylene-propylene-1,4-hexadiene copolymer rubber (15):

Ethylene/propylene (by mol): 66/34

Intrinsic viscosity [η] measured in decalin at 135° C.: 2.2 dl/g

Iodide value=15

The results are set forth in Table 3.

TABLE 3

|  | Example | | | | |
|---|---|---|---|---|---|
|  | 1 | 2 | 3 | 4 | 5 |
| Composition [parts by weight] | | | | | |
| Copolymer rubber | | | | | |
| Ethylene-propylene-VNB c.r. (1) | 100 | 100 | — | — | — |
| Ethylene-propylene-VNB c.r. (2) | — | — | 100 | — | — |
| Ethylene-propylene-VNB c.r. (3) | — | — | — | 100 | — |
| Ethylene-propylene-VNB c.r. (4) | — | — | — | — | 100 |
| Ethylene-propylene-VNB c.r. (5) | — | — | — | — | — |
| Ethylene-propylene-VNB c.r. (6) | — | — | — | — | — |
| Ethylene-propylene c.r. (7) | — | — | — | — | — |
| Ethylene-propylene c.r. (8) | — | — | — | — | — |
| Hindered phenol anti-aging agent (D) Igranox 1010 (Trade Mark) | 2 | 2 | 2 | 2 | 2 |
| Sulfur anti-aging agent (E) NOCRAC MB (Trade Mark) | 4 | 4 | 4 | 4 | 4 |
| Dicumyl peroxide Concentration 40% | | | | | |
| Mitsui DCP-40C (Trade Mark) | 7 | — | 7 | 7 | 7 |
| Kyakumill AD-40C (Trade Mark) | — | 7 | — | — | — |
| Cross-linking assistant | 4 | 4 | 4 | 4 | 4 |
| Sulfur | — | — | — | — | — |
| Vulcanizing accelerator | | | | | |
| Noceller M (Trade Mark) | — | — | — | — | — |
| Noceller TT (Trade Mark) | — | — | — | — | — |
| Vulcanized rubber | | | | | |
| Original state | | | | | |
| Effective network chain concentration [× $10^{19}$ $cc^{-1}$] | 10.8 | 10.2 | 11.8 | 12.5 | 10.1 |
| $M_{200}$ [MPa] | 7.5 | 7.2 | 8.1 | 8.9 | 7.3 |
| Thermal aging resistance 175° C. × 168 hrs. | | | | | |
| Tensile strength retention ratio $A_R$ ($T_B$) [%] | 85 | 81 | 86 | 75 | 70 |
| Elongation retention ratio $A_R$ ($E_B$) [%] | 80 | 74 | 82 | 74 | 72 |

|  | Example | | Comp. Example | | |
|---|---|---|---|---|---|
|  | 6 | 7 | 1 | 2 | 3 |
| Composition [parts by weight] | | | | | |
| Copolymer rubber | | | | | |
| Ethylene-propylene-VNB c.r. (1) | — | — | — | — | — |
| Ethylene-propylene-VNB c.r. (2) | — | — | — | — | — |
| Ethylene-propylene-VNB c.r. (3) | — | — | — | — | — |
| Ethylene-propylene-VNB c.r. (4) | — | — | — | — | — |
| Ethylene-propylene-VNB c.r. (5) | 100 | — | — | — | 100 |
| Ethylene-propylene-VNB c.r. (6) | — | 100 | — | — | — |
| Ethylene-propylene c.r. (7) | — | — | 100 | — | — |
| Ethylene-propylene c.r. (8) | — | — | — | 100 | — |
| Hindered phenol anti-aging agent (D) Igranox 1010 (Trade Mark) | 2 | 2 | 2 | 2 | 2 |
| Sulfur anti-aging agent (E) NOCRAC MB (Trade Mark) | 4 | 4 | 4 | 4 | 4 |
| Dicumyl peroxide Concentration 40% | | | | | |
| Mitsui DCP-40C (Trade Mark) | 7 | 7 | 7 | 7 | — |
| Kyakumill AD-40C (Trade Mark) | — | — | — | — | — |
| Cross-linking assistant | 4 | 4 | 4 | 4 | — |
| Sulfur | — | — | — | — | 1.5 |
| Vulcanizing accelerator | | | | | |
| Noceller M (Trade Mark) | — | — | — | — | 0.5 |
| Noceller TT (Trade Mark) | — | — | — | — | 1.0 |
| Vulcanized rubber | | | | | |
| Original state | | | | | |
| Effective network chain concentration [× $10^{19}$ $cc^{-1}$] | 16.5 | 13.5 | 4.7 | 5.1 | 5.2 |
| $M_{200}$ [MPa] | 13.5 | 12.1 | 3.9 | 4.5 | 4.1 |
| Thermal aging resistance 175° C. × 168 hrs. | | | | | |
| Tensile strength retention ratio $A_R$ ($T_B$) [%] | 72 | 83 | 63 | 70 | 4 |
| Elongation retention ratio $A_R$ ($E_B$) [%] | 70 | 82 | 80 | 84 | 2 |

|  | Comp. Example | | | |
|---|---|---|---|---|
|  | 4 | 5 | 6 | 7 |
| Composition [parts by weight] | | | | |
| Copolymer rubber | | | | |
| Ethylene-propylene-ENB c.r. (9) | 100 | — | — | — |
| Ethylene-propylene-ENB c.r. (10) | — | 100 | — | — |
| Ethylene-propylene-ENB c.r. (11) | — | — | 100 | — |
| Ethylene-propylene-DCPD c.r. (12) | — | — | — | 100 |

TABLE 3-continued

| | | | | |
|---|---|---|---|---|
| Ethylene-propylene-DCPD c.r. (13) | — | — | — | — |
| Ethylene-propylene-1,4HD c.r. (14) | — | — | — | — |
| Ethylene-propylene-1,4HD c.r. (15) | — | — | — | — |
| Hindered phenol anti-aging agent (D) Igranox 1010 (Trade Mark) | 2 | 2 | 2 | 2 |
| Sulfur anti-aging agent (E) NOCRAC MB (Trade Mark) | 4 | 4 | 4 | 4 |
| Dicumyl peroxide Concentration 40% Mitsui DCP-40C (Trade Mark) | 7 | 7 | 7 | 7 |
| Cross-linking assistant | 4 | 4 | 4 | 4 |

Vulcanized rubber

Original state

| | | | | |
|---|---|---|---|---|
| Effective network chain concentration [$\times 10^{19}$ cc$^{-1}$] | 7.8 | 9.8 | 11.5 | 7.9 |
| $M_{200}$ [MPa] | 5.1 | 6.1 | 9.5 | 5.3 |

Heat aging resistance 175° C. × 168 hrs.

| | | | | |
|---|---|---|---|---|
| Tensile strength retention ratio $A_R$ ($T_B$) [%] | 64 | 48 | 31 | 50 |
| Elongation retention ratio $A_R$ ($E_B$) [%] | 57 | 30 | 20 | 48 |

| | Comp. Example | | |
|---|---|---|---|
| | 8 | 9 | 10 |

Composition [parts by weight]

Copolymer rubber

| | | | |
|---|---|---|---|
| Ethylene-propylene-ENB c.r. (9) | — | — | — |
| Ethylene-propylene-ENB c.r. (10) | — | — | — |
| Ethylene-propylene-ENB c.r. (11) | — | — | — |
| Ethylene-propylene-DCPD c.r. (12) | — | — | — |
| Ethylene-propylene-DCPD c.r. (13) | 100 | — | — |
| Ethylene-propylene-1,4HD c.r. (14) | — | 100 | — |
| Ethylene-propylene-1,4HD c.r. (15) | — | — | 100 |
| Hindered phenol anti-aging agent (D) Igranox 1010 (Trade Mark) | 2 | 2 | 2 |
| Sulfur anti-aging agent (E) NOCRAC MB (Trade Mark) | 4 | 4 | 4 |
| Dicumyl peroxide Concentration 40% Mitsui DCP-40C (Trade Mark) | 7 | 7 | 7 |
| Cross-linking assistant | 4 | 4 | 4 |

Vulcanized rubber

Original state

| | | | |
|---|---|---|---|
| Effective network chain concentration [$\times 10^{19}$ cc$^{-1}$] | 10.2 | 6.5 | 6.9 |
| $M_{200}$ [MPa] | 7.4 | 4.6 | 5.0 |

Thermal aging resistance 175° C. × 168 hrs.

| | | | |
|---|---|---|---|
| Tensile strength retention ratio $A_R$ ($T_B$) [%] | 40 | 70 | 64 |
| Elongation retention ratio $A_R$ ($E_B$) [%] | 24 | 62 | 57 |

VNB: 5-vinyl-2-norbornene
ENB: 5-ethylidene-2-norbonene, DCPD: dicylcopentadiene, 1,4HD: 1,4-hexadiene Described below are components used in the following examples 8–18 and comparative examples 11–25.

[1] Components used in Examples 8–14 and Comparative Examples 11–20

Ethylene-α-olefin-nonconjugated polyene copolymer rubber (A-1): Ethylene-propylene-5-vinyl-2-norbornene copolymer rubber Ethylene/propylene (by mol): 68/32
Iodine value: 3
Intrinsic viscosity [η]: 2.2 dl/g (A-2): Ethylene-propylene-5-vinyl-2-norbornene copolymer rubber Ethylene/propylene (by mol): 68/32
Iodine value: 15
Intrinsic viscosity [η]: 2.2 dl/g (A-3): Ethylene-propylene-5-ethylidene-2-norbornene copolymer rubber Ethylene/propylene (by mol): 68/32
Iodine value: 3
Intrinsic viscosity [η]: 2.2 dl/g (A-4): Ethylene-propylene-dicyclopentadiene copolymer rubber Ethylene/propylene (by mol): 68/32
Iodine value: 3
Intrinsic viscosity [η]: 2.2 dl/g (A-5): Ethylene-propylene-1,4-hexadiene copolymer rubber Ethylene/propylene (by mol): 68/32
Iodine value: 3
Intrinsic viscosity [η]: 2.2 dl/g (A-6): Ethylene-propylene-5-ethylidene-2-norbornene copolymer rubber Ethylene/propylene (by mol): 68/32
Iodine value: 22
Intrinsic viscosity [η]: 1.9 dl/g (A-7): Ethylene-propylene copolymer rubber Ethylene/propylene (by mol): 58/42
Iodine value: 0
Intrinsic viscosity [η]: 2.4 dl/g Amine type anti-aging agent (C)

(C-1): N,N'-Di-2-naphthyl-p-phenylenediamine
(C-2): N,N'-Diphenyl-p-phenylenediamine
(C-3): 4,4'-(α,α-dimethylbenzyl)diphenylamine Hindered phenol type anti-aging agent (D)

(D-1): 3,9-Bis[2-{3-(3-t-butyl-4-hydroxy-5-methylphenyl)propionyloxy}-1,1-dimethylethyl]-2,4-8,10-tetraoxaspiro[5,5]undecane Sulfur type anti-aging agent (E)

(E-1): Pentaerythritol-tetrakis-(β-lauryl-thiopropionate)

Phosphite type anti-aging agent (F-1): 4,4'-Butylidenebis(3-methyl-6-t-di-tridecylphosphite)

[2] Components used in Examples 15–18 and Comparative Examples 21–25

Copolymer rubber (A1)

(A1-1): Ethylene-propylene-5-vinyl-2-norbornene copolymer rubber

Ethylene/propylene (by mol): 78/22
Iodine value: 3
Intrinsic viscosity [η]: 3.7 dl/g (A1-2): Ethylene-propylene-5-vinyl-2-norbornene copolymer rubber Ethylene/propylene (by mol): 68/32
Iodine value: 3
Intrinsic viscosity [η]: 3.5 dl/g (A1-3): Ethylene-propylene-5-vinyl-2-norbornene copolymer rubber Ethylene/propylene (by mol): 68/32
Iodine value: 3
Intrinsic viscosity [η]: 4.0 dl/g (A1-4): Ethylene-propylene-5-ethylidene-2-norbornene copolymer rubber Ethylene/propylene (by mol): 78/22
Iodine value: 3
Intrinsic viscosity [η]: 3.7 dl/g
(A1-5): Ethylene-propylene-dicyclopentadiene copolymer rubber
Ethylene/propylene (by mol): 78/22
Iodine value: 3
Intrinsic viscosity [η]: 3.7 dl/g
(A1-6): Ethylene-propylene copolymer rubber
Ethylene/propylene (by mol): 80/20
Iodine value: 0
Intrinsic viscosity [η]: 3.7 dl/g
(A1-7): Ethylene-propylene-5-ethylidene-2-norbornene copolymer rubber
Ethylene/propylene (by mol): 68/32
Iodine value: 6
Intrinsic viscosity [η]: 2.2 dl/g
Copolymer rubber
(A2-1): Ethylene-propylene-5-vinyl-2-norbornene copolymer rubber
Ethylene/propylene (by mol): 78/22
Iodine value: 3
Intrinsic viscosity [η]: 0.6 dl/g
(A2-2): Ethylene-propylene-5-vinyl-2-norbornene copolymer rubber
Ethylene/propylene (by mol): 68/32
Iodine value: 3
Intrinsic viscosity [η]: 0.5 dl/g
(A2-3): Ethylene-propylene-5-vinyl-2-norbornene copolymer rubber
Ethylene/propylene (by mol): 68/32
Iodine value: 3
Intrinsic viscosity [η]: 0.3 dl/g
(A2-4): Ethylene-propylene-5-ethylidene-2-norbornene copolymer rubber
Ethylene/propylene (by mol): 78/22
Iodine value: 3
Intrinsic viscosity [η]: 0.6 dl/g
(A2-5): Ethylene-propylene-dicyclopentadiene copolymer rubber
Ethylene/propylene (by mol): 78/22
Iodine value: 3
Intrinsic viscosity [η]: 0.6 dl/g
(A2-6): Ethylene-propylene copolymer rubber
Ethylene/propylene (by mol): 80/20
Iodine value: 0
Intrinsic viscosity [η]: 0.5 dl/g
Amine type anti-aging agent (C)
(C-1): N,N '-di-2-naphthyl-p-phenylenediamine
Hindered phenol type anti-agent agent (D).
(D-1): 3,9-Bis[2-{3-(3-t-butyl-4-hydroxy-5-methylphenyl)propionyloxy}-1,1-dimethylethyl]-2,4-8,10-tetraoxaspiro[5,5]undecane
Sulfur type anti-aging agent (E)
(E-1): Pentaerythritol-tetrakis-(β-lauryl-thiopropionate)
Phosphite type anti-aging agent
(F-1): 4,4'-Butylidenebis(3-methyl-6-t-di-tridecylphosphite)

Properties of the vulcanized rubbers obtained in the following examples were measured in accordance with the methods described below.

[1] Property tests of vulcanized rubbers obtained in Examples 8–14 and Comparative Examples 10–20

Test items
 tensile test, aging test
Test methods
The tensile test and the aging test were carried out in accordance with JIS K 6301. That is, tensile strength ($T_B$) and elongation ($E_B$) were measured in the tensile test.

As the aging test, an air-oven aging test was carried out at 120° C. for 70 hours. In this test, retention ratios of the properties to those before aging, i.e., a tensile strength retention ratio $A_R(T_B)$, an elongation retention ratio $A_R(E_B)$ and a retention ratio of tensile strength×elongation $A_R(T_B \times E_B)$, were measured.

[2] Property tests of vulcanized rubbers obtained in Examples 15–18 and Comparative Examples 21–25
(1) Property in original state
 tensile strength ($T_B$), elongation ($E_B$)
(2) Thermal aging resistance (190° C.×168 hrs)
 tensile strength retention ratio [$A_R(T_B)$]
 elongation retention ratio [$A_R(E_B)$]
 retention ratio of tensile strength×elongation [$A_R(T_B \times E_B)$]
Molding processability
(a) Roll processability
The kneadate obtained in each example was allowed to stand at room temperature for 24 hours. The kneadate of 1.5 kg was wound around 8-inch open rolls at each roll temperature of 50° C. keeping a gap of 5 mm between rolls. The state of the kneadate wound around the rolls was observed and evaluated by the following five ranks.
Five-rank evaluation
5: The rubber band perfectly adheres to the roll, and the bank smoothly rotates.
4: Rubber band sometimes separates from the roll surface between the top of the roll and the bank.
3: Rubber band separates from the roll surface between the top of the roll and the bank.
2: Rubber band does not adhere to the roll surface, and the roll processing is impossible unless the band is supported by hand.
1: Rubber band does not adhere at all to the roll surface and hangs down. The roll processing is impossible unless the band is supported by hand.
(b) Extrusion processability
The kneadate obtained in each example was allowed to stand at room temperature for 24 hours. The kneadate was extruded by a 50 mm extruder under the below-described conditions. The surface of the extruded product was evaluated by the following five ranks as an indication of the extrusion processability.
Extrusion conditions
 Extruder: 50 mm extruder having L/D of 14 and equipped with a modified Garvey die
 Extrusion temperature: back of cylinder/front of cylinder/head=60° C./70° C./80° C.
Five-rank evaluation
5: No protrusions and depressions are observed on the surface, and the gloss is excellent.
4: Protrusions and depressions are rarely observed on the surface, and the gloss is bad.
3: Protrusions and depressions are slightly observed, and the gloss is bad.
2: Protrusions and depressions are observed on the surface, and the gloss is bad.
1: Conspicuous protrusions and depressions are observed on the surface, and the gloss is very bad.

Examples 8–14, Comparative examples 10–20

Rubber compounding ingredients common to Examples 8 to 14 and Comparative Examples 10 to 20 and the amounts thereof are set forth in Table 4.

TABLE 4

| Ingredient | Amount (parts by weight) |
|---|---|
| Copolymer rubber | 100 |
| Soft silica *1 | 30 |
| Talc *2 | 30 |
| Paraffinic oil *3 | 10 |
| Zinc white | 5 |
| Stearic acid | 2 |
| Organic peroxide *4 | 6.8 |

*1: Aerosil (trade name, available from Nippon Silica Industrial Co., Ltd.)
*2: Hightoron (trade name, available from Takehara Chemical Industrial Corporation)
*3: Diana Process Oil PW-380 (trade name, available from Idemitsu Kosan Co., Ltd.)
*4: a product of 40% by weight of dicumyl peroxide The rubber compounding ingredients shown in Table 4 and other compounding ingredients shown in Table 5 were used in the amounts shown in Table 4 and Table 5, to prepare a rubber composition.

In the preparation, the ingredients other than the organic peroxide were kneaded at 140° to 150° C. for 5 minutes using a 1.7 liter Banbury mixer. Then, the resulting kneadate and the organic peroxide were kneaded at 50° to 60° C. for 5 minutes using an 8 inch open roll.

The resulting kneadate was subjected to press vulcanization at 170° C. for 10 minutes to prepare a vulcanized rubber sheet having a thickness of 2 mm, from which specimens for the above tests were prepared.

TABLE 5

| | Example | | | |
|---|---|---|---|---|
| | 8 | 9 | 10 | 11 |
| Composition [parts by weight] | | | | |
| Copolymer rubber | | | | |
| Ethylene-propylene-VNB c.r. (A-1) | 100 | 100 | 100 | — |
| Ethylene-propylene-VNB c.r. (A-2) | — | — | — | 100 |
| Ethylene-propylene-ENB c.r. (A-3) | — | — | — | — |
| Ethylene-propylene-DCPD c.r. (A-4) | — | — | — | — |
| Ethylene-propylene-1,4HD c.r. (A-5) | — | — | — | — |
| Ethylene-propylene-ENB c.r. (A-6) | — | — | — | — |
| Ethylene-propylene c.r. (A-7) | — | — | — | — |
| Amine anti-aging agent (C) | | | | |
| N,N'-di-2-naphthyl-p-phenylenediamine (C-1) | 1 | — | — | — |
| N,N'-diphenyl-p-phenylenediamine (C-2) | — | 1 | — | — |
| Hindered phenol anti-aging agent (D) 3,9-bis [2-{3-(3-t-butyl-4-hydroxy-5-methylphenyl)propinonyloxy}-1,1-dimethylethyl]-2,4-8,10-tetraoxaspiro[5,5]undecane (D-1) | — | — | 1 | 1 |
| Sulfur anti-aging agent (E) Pentaerythritol-tetrakis-(β-lauryl-thiopropionate) (E-1) | 4 | 4 | 4 | 4 |
| Vulcanized rubber | | | | |
| Original state | | | | |
| tensile strength $T_B$ [kgf/cm$^2$] | 108 | 102 | 115 | 105 |
| elongation $E_B$ [%] | 540 | 530 | 520 | 500 |
| Thermal aging resistance 175° C. × 168 hrs. | | | | |
| Tensile strength retention ratio $A_R (T_B)$ [%] | 69 | 65 | 72 | 60 |
| Elongation retention ratio | | | | |
| $A_R (E_B)$ [%] | 75 | 74 | 70 | 74 |
| $A_R (T_B \times E_B)$ [%] | 52 | 48 | 51 | 42 |

| | Comp. Example | | | | | |
|---|---|---|---|---|---|---|
| | 11 | 12 | 13 | 14 | 15 | 16 |
| Composition [parts by weight] | | | | | | |
| Copolymer rubber | | | | | | |
| Ethylene-propylene-VNB c.r. (A-1) | — | — | — | 100 | — | — |
| Ethylene-propylene-VNB c.r. (A-2) | — | — | — | — | — | — |
| Ethylene-propylene-ENB c.r. (A-3) | 100 | — | — | — | — | — |
| Ethylene-propylene-DCPD c.r. (A-4) | — | — | — | — | 100 | — |
| Ethylene-propylene-1,4HD c.r. (A-5) | — | — | — | — | — | 100 |
| Ethylene-propylene-ENB c.r. (A-6) | — | 100 | — | — | — | — |
| Ethylene-propylene c.r. (A-7) | — | — | 100 | — | — | — |
| Amine anti-aging agent (C) | | | | | | |
| N,N'-di-2-naphthyl-p-phenylenediamine (C-1) | 1 | 1 | 1 | 2 | 1 | 1 |
| N,N'-diphenyl-p-phenylenediamine (C-2) | — | — | — | — | — | — |
| Hindered phenol anti-aging agent (D) 3,9-bis [2-{3-(3-t-butyl-4-hydroxy-5-methylphenyl)propinonyloxy}-1,1-dimethylethyl]-2,4-8,10-tetraoxaspiro [5,5]undecane (D-1) | — | 1 | 1 | 2 | — | — |
| Sulfur anti-aging agent (E) Pentaerythritol-tetrakis-(β-lauryl-thiopropionate) (E-1) | 4 | 4 | 4 | — | 4 | 4 |
| Vulcanized rubber | | | | | | |
| Original state | | | | | | |
| tensile strength $T_B$ [kgf/cm$^2$] | 104 | 112 | 96 | 106 | 103 | 105 |
| elongation $E_B$ [%] | 650 | 490 | 680 | 520 | 630 | 650 |
| Thermal aging resistance 175° C. × 168 hrs. | | | | | | |
| Tensile strength retention ratio $A_R (T_B)$ [%] | 46 | 48 | 32 | 28 | 24 | 18 |
| Elongation retention ratio | | | | | | |
| $A_R (E_B)$ [%] | 40 | 42 | 70 | 30 | 18 | 40 |
| $A_R (T_B \times E_B)$ [%] | 18 | 20 | 22 | 8 | 4 | 8 |

| | Example | | |
|---|---|---|---|
| | 12 | 13 | 14 |
| Composition (parts by weight) | | | |
| Copolymer rubber | | | |
| Ethylene-propylene-VNB c.r. (A-1) | 100 | 100 | 100 |
| Ethylene-propylene-ENB c.r. (A-3) | — | — | — |
| Ethylene-propylene-ENB c.r. (A-6) | — | — | — |
| Ethylene-propylene c.r. (A-7) | — | — | — |

TABLE 5-continued

| Amine anti-aging agent (C) | | | |
|---|---|---|---|
| N,N'-di-2-naphthyl-p-phenylenediamine (C-1) | 1 | — | — |
| N,N'-diphenyl-p-phenylenediamine (C-2) | — | 1 | — |
| 4,4'-(α,α-dimethylbenzyl)diphenylamine (C-3) | — | — | 1 |
| Hindered phenol anti-aging agent (D) 3,9-bis [2-{3-(3-t-butyl-4-hydroxy-5-methylphenyl)propinonyloxy}-1,1-dimethylethyl]-2,4-8,10-tetraoxaspiro[5,5]undecane (D-1) | 1 | 1 | 1 |
| Sulfur anti-aging agent (E) Pentaerythritol-tetrakis-(β-lauryl-thiopropionate) (E-1) | 4 | 4 | 4 |
| Phosphite anti-aging agent 4,4'-butylidenebis(3-methyl-6-t-buthyl-di-tridecylphosphite) (F-1) | — | — | — |

Vulcanized rubber

Ordinary state

| | | | |
|---|---|---|---|
| tensile strength $T_B$ [kgf/cm$^2$] | 108 | 102 | 115 |
| elongation $E_B$ [%] | 540 | 530 | 520 |

Heat aging resistance 175° C. × 168 hrs.

| | | | |
|---|---|---|---|
| Tensile strength retention ratio $A_R$ ($T_B$) [%] | 69 | 65 | 72 |

Elongation retention ratio

| | | | |
|---|---|---|---|
| $A_R$ ($E_B$) [%] | 75 | 74 | 70 |
| AR ($T_B \times E_B$) [%] | 52 | 48 | 51 |

| | Comp. Ex. | | | |
|---|---|---|---|---|
| | 17 | 18 | 19 | 20 |

Composition (parts by weight)

Copolymer rubber

| | | | | |
|---|---|---|---|---|
| Ethylene-propylene-VNB c.r. (A-1) | — | — | — | 100 |
| Ethylene-propylene-ENB c.r. (A-3) | — | — | 100 | — |
| Ethylene-propylene-ENB c.r. (A-6) | 100 | — | — | — |
| Ethylene-propylene c.r. (A-7) | — | 100 | — | — |

Amine anti-aging agent (C)

| | | | | |
|---|---|---|---|---|
| N,N'-di-2-naphthyl-p-phenylenediamine (C-1) | 1 | 1 | 1 | 1 |
| N,N'-diphenyl-p-phenylenediamine (C-2) | — | — | — | — |
| 4,4'-(α,α-dimethylbenzyl)diphenylamine (C-3) | — | — | — | — |
| Hindered phenol anti-aging agent (D) 3,9-bis [2-{3-(3-t-butyl-4-hydroxy-5-methylphenyl)propinonyloxy}-1,1-dimethylethyl]-2,4-8,10-tetraoxaspiro[5,5]undecane (D-1) | 1 | 1 | — | 1 |
| Sulfur anti-aging agent (E) Pentaerythritol-tetrakis-(β-lauryl-thiopropionate) (E-1) | 4 | 4 | 4 | — |
| Phosphite anti-aging agent 4,4'-butylidenebis(3-methyl-6-t-buthyl-di-tridecylphosphite) (F-1) | — | — | — | 4 |

Vulcanized rubber

Ordinary state

| | | | | |
|---|---|---|---|---|
| tensile strength $T_B$ [kgf/cm$^2$] | 112 | 96 | 94 | 98 |
| elongation $E_B$ [%] | 490 | 590 | 610 | 600 |

Heat aging resistance 175° C. × 168 hrs.

| | | | | |
|---|---|---|---|---|
| Tensile strength retention ratio $A_R$ ($T_B$) [%] | 48 | 32 | 24 | 18 |

Elongation retention ratio

| | | | | |
|---|---|---|---|---|
| $A_R$ ($E_B$) [%] | 42 | 70 | 35 | 20 |
| AR ($T_B \times E_B$) [%] | 20 | 22 | 8 | 4 |

VNB: 5-vinyl-2-norbornene, ENB: 5-ethylidene-2-norbornene DCPD: dicylopentadiene, 1,4HD: 1,4-hexadine

Examples 15–18 Comparative examples 21–25

Rubber compounding ingredients common to Examples 15 to 18 and Comparative Examples 21 to 25 and the amounts thereof are set forth in Table 6.

TABLE 6

| Ingredient | Amount (parts by weight) |
|---|---|
| Copolymer rubber (A1) and/or Copolymer rubber (A2) | 100 |
| Soft silica *1 | 30 |
| Talc *2 | 30 |
| Paraffinic oil *3 | 10 |
| Zinc white | 5 |
| Stearic acid | 2 |
| Organic peroxide *4 | 6.8 |

*1: Aerosil (trade name, available from Nippon Silica Industrial Co., Ltd.)
*2: Hightoron (trade name, available from Takehara Chemical Industrial Corporation)
*3: Diana Process Oil PW-380 (trade name, available from Idemitsu Kosan Co., Ltd.)
*4: a product of 40% by weight of dicumyl peroxide The rubber compounding ingredients shown in Table 6 and other compounding ingredients shown in Table 7 were used in the amounts shown in Table 6 and Table 7, to prepare a rubber composition.

In the preparation, the ingredients other than the organic peroxide were kneaded at 140° to 150° C. for 5 minutes using a 1.7 liter Banbury mixer. Then, the resulting kneadate and the organic peroxide were kneaded at 50° to 60° C. for 5 minutes using an 8 inch open roll.

The resulting kneadate was subjected to press vulcanization at 170° C. for 10 minutes to prepare a vulcanized rubber sheet having a thickness of 2 mm, from which specimens for the above tests were prepared.

The resulting specimens were subjected to the above test.

The results are set forth in Table 7.

TABLE 7

| | Example | | | Comp. Ex. | |
|---|---|---|---|---|---|
| | 15 | 16 | 17 | 21 | 22 |

Composition (parts by weight)

Copolymer rubber (A-1)

| | | | | | |
|---|---|---|---|---|---|
| (A1-1) | 50 | — | — | — | — |
| (A1-2) | — | 70 | — | — | — |
| (A1-3) | — | — | 70 | — | — |
| (A1-4) | — | — | — | 50 | — |
| (A1-5) | — | — | — | — | 50 |

Copolymer rubber (A2)

| | | | | | |
|---|---|---|---|---|---|
| (A2-1) | 50 | — | — | — | — |
| (A2-2) | — | 30 | — | — | — |
| (A2-3) | — | — | 30 | — | — |
| (A2-4) | — | — | — | 50 | — |

TABLE 7-continued

| | | | | | |
|---|---|---|---|---|---|
| (A2-5) | — | — | — | — | 50 |
| Amine anti-aging agent (C) (C-1) | 1 | 1 | 1 | 1 | 1 |
| Hindered phenol anti-aging agent (D) (D-1) | 1 | 1 | 1 | 1 | 1 |
| Sulphur anti-aging agent (E) (E-1) | 4 | 4 | 4 | 4 | 4 |
| Vulcanized rubber | | | | | |
| Original state | | | | | |
| Tensile strength $T_B$ (kgf/cm²) | 118 | 108 | 104 | 113 | 108 |
| Elogation $E_B$ (%) | 510 | 470 | 470 | 680 | 690 |
| Thermal aging resistance 190° C. × 168 hrs. | | | | | |
| Tensile strength retention ratio $A_R (T_B)$ (%) | 65 | 68 | 64 | 40 | 38 |
| Elongation retention ratio $A_R (E_B)$ (%) | 78 | 70 | 72 | 58 | 56 |
| $A_R (T_B × E_B)$ (%) | | | | | |
| Processability | | | | | |
| Roll processability | 5 | 5 | 5 | 5 | 5 |
| Extrusion processability | 5 | 5 | 5 | 5 | 5 |

| | Comp. Example | | | Ex. |
|---|---|---|---|---|
| | 23 | 24 | 25 | 18 |
| Composition (parts by weight) | | | | |
| Copolymer rubber (A-1) | | | | |
| (A1-1) | — | — | 50 | 50 |
| (A1-6) | 50 | — | — | — |
| (A1-7) | — | 100 | — | — |
| Copolymer rubber (A2) | | | | |
| (A2-1) | — | — | 50 | 50 |
| (A2-6) | 50 | — | — | — |
| Amine anti-aging ageng (C) (C-1) | 1 | 1 | 1 | 1 |
| Hindered phenol anti-aging agent (D) (D-1) | 1 | 1 | 1 | 1 |
| Sulfur anti-aging agent (E) (E-1) | 4 | 4 | — | 4 |
| Phosphite anti-aging agent 4,4'-butylidenbis(3-methy-6-t-butyl-di-tridecylphosphite) (F-1) | — | — | 4 | — |
| Vulcanized rubber | | | | |
| Original state | | | | |
| Tensile strength $T_B$ (kgf/cm²) | 104 | 125 | 103 | 138 |
| Elogation $E_B$ (%) | 670 | 680 | 480 | 550 |
| Theremal aging resistance 190° C. × 168 hrs. | | | | |
| Tensile strength retention ratio $A_R (T_B)$ (%) | 32 | 40 | 15 | 64 |
| Elogation retention ratio $A_R (E_B)$ (%) | 59 | 51 | 20 | 76 |
| $A_R (T_B × E_B)$ (%) | | | | |
| Processability | | | | |
| Roll processability | 5 | 2 | 5 | 5 |
| Extrusion processability | 5 | 1 | 5 | 5 |

Remark: In Example 18, 1 part by weight of Sanceler AP (Trademark, available from Sanshin Kagaku Kogyo K.K.) was added as vulcanization aid in addition to the above components.

What is claimed is:

1. A heat-resistant rubber composition comprising:

an ethylene-α-olefin-nonconjugated polyene copolymer rubber (A) composed of ethylene, an α-olefin of 3 to 20 carbon atoms and a nonconjugated polyene, and an organic peroxide (B); and having vulcanizable properties, said ethylene-α-olefin-nonconjugated polyene copolymer rubber (A) having the following properties:

(1) a molar ratio of ethylene to the α-olefin of 3 to 20 carbon atoms is in the range of 40/60 to 95/5 (ethylene/α-olefin), (2) the nonconjugated polyene is 5-vinyl-2-norbornene, 5-isopropenyl-2-norbornene or 5-isobutenyl-2-norbornene, (3) the nonconjugated polyene content is in the range of 0.5 to 50 g/100 g in terms of iodine value, and (4) an intrinsic viscosity (η), as measured in decahydronaphthalene at 135° C., of 0.1 to 10 dl/g.

2. A heat-resistant rubber composition comprising:

(I) an ethylene-e-olefin-nonconjugated polyene copolymer rubber (A) composed of ethylene, an α-olefin of 3 to 20 carbon atoms and a nonconjugated polyene, in an amount of 100 parts by weight, (II) an amine type anti-aging agent (C) composed of diphenylamines and/or phenylenediamines, in an amount of 0.2 to 5 parts by weight, and/or a hindered phenol type anti-aging agent (D) in an amount of 0.2 to 5 parts by weight, and (III) a sulfur type anti-aging agent (E) in an amount of 1 to 10 parts by weight; and
having vulcanizable properties, said ethylene-α-olefin-nonconjugated polyene copolymer rubber (A) having the following properties:

(1) a molar ratio of ethylene to the α-olefin of 3 to 20 carbon atoms is in the range of 40/60 to 95/5 (ethylene/α-olefin), (2) the nonconjugated polyene is 5-vinyl-2-norbornene, 5-isopropenyl-2-norbornene or 5-isobutenyl-2-norbornene, (3) the nonconjugated polyene content is in the range of 0.5 to 50 g/100 g in terms of an iodine value, and (4) an intrinsic viscosity (η), as measured in decalin at 135° C., of 0.1 to 10 dl/g.

3. The heat-resistant rubber composition as claimed in claim 2 wherein the ethylene-α-olefin-nonconjugated polyene copolymer rubber (A) is a blend of:

(I) an ethylene-α-olefin-nonconjugated polyene copolymer rubber (A1) having an intrinsic viscosity (η), as measured in decalin at 135° C., of 1 to 10 dl/g, in an amount of 30 to 95 parts by weight, and (II) an ethylene-α-olefin-nonconjugated polyene copolymer rubber (A2) having an intrinsic viscosity (η), as measured in decalin at 135° C., of 0.1 to 5 dl/g, this intrinsic viscosity being different from the intrinsic viscosity of the ethylene-α-olefin-nonconjugated polyene copolymer rubber (A1), in an amount of 5 to 70 parts by weight, the total amount of said components (A1) and (A2) being 100 parts by weight; and said ethylene-α-olefin-nonconjugated polyene copolymer rubber (A1) having the following properties:

(1) said copolymer rubber is a copolymer rubber composed of ethylene, an α-olefin of 3 to 20 carbon atoms and a nonconjugated polyene, (2) a molar ratio of ethylene to the α-olefin of 3 to 20 carbon atoms is in the range of 40/60 to 95/5 (ethylene/α-olefin), (3) the nonconjugated polyene is 5-vinyl-2-norbornene, and (4) the nonconjugated polyene content is in the range of 0.5 to 50 g/100 g in terms of an iodine value; and said ethylene-α-olefin-nonconjugated polyene copolymer rubber (A2) having the following properties:

(1) said copolymer rubber is a copolymer rubber composed of ethylene, an α-olefin of 3 to 20 carbon atoms and a nonconjugated polyene, (2) a molar ratio of ethylene to the α-olefin of 3 to 20 carbon atoms is in the range of 40/60 to 95/5 (ethylene/α-olefin), (3) the nonconjugated polyene is 5-vinyl-2-norbornene, 5-isopropenyl-2-norbornene or 5-isobutenyl-2-norbornene, and (4) the nonconjugated polyene content is in the range of 0.5 to 50 g/100 g in terms of an iodine value.

4. The heat-resistant rubber composition as claimed in claim 3, wherein the ethylene-α-olefin-nonconjugated polyene copolymer rubber (A) which is a blend of the ethylene-α-olefin-nonconjugated polyene copolymer rubber (A1) and the ethylene-α-olefin-nonconjugated polyene copolymer rubber (A2) has:

(i) a Mooney viscosity ($ML_{1+4}(100°$ C.)) of 5 to 180, (ii) a molar ratio of ethylene to the α-olefin of 40/60 to 95/5 (ethylene/α-olefin), and (iii) a nonconjugated polyene content of 0.5 to 50 g/100 g in terms of an iodine value.

5. The heat-resistant rubber composition as claimed in claim 3 or claim 4, wherein the ethylene-α-olefin-nonconjugated polyene copolymer rubber (A1) and/or the ethylene-α-olefin-nonconjugated polyene copolymer rubber (A2) is an ethylene-α-olefin-nonconjugated polyene copolymer rubber having been graft-modified with an unsaturated carboxylic acid or its derivative.

* * * * *